United States Patent
McGarry et al.

(10) Patent No.: US 9,411,528 B1
(45) Date of Patent: Aug. 9, 2016

(54) STORAGE MANAGEMENT SYSTEMS AND METHODS

(71) Applicant: Ryft Systems, Inc., Rockville, MD (US)

(72) Inventors: Patrick F. McGarry, Columbia, MD (US); David B. Sorber, Rockville, MD (US); Timothy P. Bresnan, Finksburg, MD (US); Andrew Huo, Rockville, MD (US); Robert M. Harris, Frederick, MD (US); Varun K. Agrawal, Ellicott City, MD (US)

(73) Assignee: Ryft Systems, Inc., Rockville, MD (US)

( * ) Notice: Subject to any disclaimer, the term of this patent is extended or adjusted under 35 U.S.C. 154(b) by 0 days.

(21) Appl. No.: 14/693,634

(22) Filed: Apr. 22, 2015

(51) Int. Cl.
*G06F 3/06* (2006.01)

(52) U.S. Cl.
CPC ............ *G06F 3/0626* (2013.01); *G06F 3/0619* (2013.01); *G06F 3/0643* (2013.01); *G06F 3/0655* (2013.01); *G06F 3/0665* (2013.01); *G06F 3/0688* (2013.01); *G06F 3/0689* (2013.01); *G06F 2003/0692* (2013.01)

(58) Field of Classification Search
None
See application file for complete search history.

(56) References Cited

U.S. PATENT DOCUMENTS

| | | | |
|---|---|---|---|
| 6,029,166 A * | 2/2000 | Mutalik | ............... G06F 3/0619 |
| 6,076,152 A | 6/2000 | Huppenthal et al. | |
| 6,137,738 A | 10/2000 | Vorgert | |
| 6,247,110 B1 | 6/2001 | Huppenthal et al. | |
| 6,339,819 B1 | 1/2002 | Huppenthal et al. | |
| 6,434,687 B1 | 8/2002 | Huppenthal | |
| 6,681,354 B2 | 1/2004 | Gupta | |
| 6,934,725 B1 * | 8/2005 | Dings | ................. G06F 11/1466 707/610 |
| 6,961,841 B2 | 11/2005 | Huppenthal et al. | |
| 6,964,029 B2 | 11/2005 | Poznanovic et al. | |
| 6,983,456 B2 | 1/2006 | Poznanovic et al. | |
| 7,003,593 B2 | 2/2006 | Huppenthal et al. | |
| 7,054,927 B2 * | 5/2006 | Ulrich | ............... G06F 17/30067 707/999.102 |
| 7,134,120 B2 | 11/2006 | Hammes | |
| 7,155,602 B2 | 12/2006 | Poznanovic | |
| 7,155,708 B2 | 12/2006 | Hammes et al. | |
| 7,167,976 B2 | 1/2007 | Poznanovic | |
| 7,225,324 B2 | 5/2007 | Huppenthal et al. | |
| 7,237,091 B2 | 6/2007 | Huppenthal et al. | |
| 7,299,458 B2 | 11/2007 | Hammes | |
| 7,310,759 B1 | 12/2007 | Carmichael et al. | |
| 7,552,042 B1 | 6/2009 | Brebner et al. | |
| 7,584,345 B2 | 9/2009 | Doering et al. | |
| 7,603,540 B2 | 10/2009 | Doering et al. | |
| 7,620,800 B2 | 11/2009 | Huppenthal et al. | |
| 7,703,085 B2 | 4/2010 | Poznanovic et al. | |

(Continued)

FOREIGN PATENT DOCUMENTS

| | | |
|---|---|---|
| CN | 201037908 Y | 3/2008 |
| CN | 101236488 A | 8/2008 |

(Continued)

OTHER PUBLICATIONS

Bellows, P., et al., (Apr. 1998) "JHDL—An HDL for Reconfigurable Systems", In FPGAs for Custom Computing Machines, IEEE Symposium on, pp. 175-184.

(Continued)

*Primary Examiner* — Yaima Rigol
(74) *Attorney, Agent, or Firm* — Goodwin Procter LLP

(57) ABSTRACT

A hardware-based storage node manager enables processing devices to perform file access operations without invoking the file-data access functions of an operating system.

15 Claims, 4 Drawing Sheets

(56) References Cited

U.S. PATENT DOCUMENTS

| | | | |
|---|---|---|---|
| 7,747,702 | B2 | 6/2010 | Anderson et al. |
| 7,856,545 | B2 | 12/2010 | Casselman |
| 7,873,961 | B2 | 1/2011 | Miller et al. |
| 8,020,163 | B2 | 9/2011 | Nollet et al. |
| 8,436,644 | B2 | 5/2013 | Watanabe et al. |
| 8,468,301 | B2 * | 6/2013 | Withers ............... G06F 3/0613 711/114 |
| 8,713,518 | B2 | 4/2014 | Pointer et al. |
| 8,863,065 | B1 | 10/2014 | Chow et al. |
| 8,930,892 | B2 | 1/2015 | Pointer et al. |
| 2001/0014937 | A1 | 8/2001 | Huppenthal et al. |
| 2003/0217306 | A1 | 11/2003 | Harthcock et al. |
| 2004/0049672 | A1 | 3/2004 | Nollet et al. |
| 2008/0095300 | A1 | 4/2008 | Zingelewicz et al. |
| 2010/0218200 | A1 | 8/2010 | Lutterkort |
| 2011/0197256 | A1 | 8/2011 | Sharkey et al. |
| 2011/0296133 | A1 * | 12/2011 | Flynn ............... G06F 11/1048 711/171 |
| 2012/0151094 | A1 | 6/2012 | Cooke |
| 2013/0073519 | A1 * | 3/2013 | Lewis ............... G06F 17/30215 707/610 |
| 2013/0080732 | A1 * | 3/2013 | Nellans ............... G06F 12/0246 711/206 |
| 2013/0227236 | A1 * | 8/2013 | Flynn ..................... G11C 16/26 711/165 |
| 2013/0254477 | A1 * | 9/2013 | Swanson ................ G06F 3/061 711/112 |
| 2013/0343379 | A1 | 12/2013 | Stroud et al. |
| 2013/0346669 | A1 | 12/2013 | Nightingale et al. |
| 2013/0346759 | A1 | 12/2013 | LaMacchia et al. |
| 2013/0346985 | A1 | 12/2013 | Nightingale |
| 2014/0122762 | A1 | 5/2014 | Yu et al. |
| 2014/0169133 | A1 | 6/2014 | Nemeth et al. |
| 2014/0237284 | A1 | 8/2014 | Fine et al. |
| 2014/0244766 | A1 | 8/2014 | Mo et al. |

FOREIGN PATENT DOCUMENTS

| | | |
|---|---|---|
| CN | 201247471 Y | 5/2009 |
| CN | 100530009 C | 8/2009 |
| CN | 201353157 Y | 12/2009 |
| CN | 101826038 A | 9/2010 |
| CN | 101883217 A | 11/2010 |
| CN | 201698002 U | 1/2011 |
| CN | 102184158 A | 9/2011 |
| CN | 102436840 A | 5/2012 |
| CN | 102710424 A | 10/2012 |
| CN | 102779079 A | 11/2012 |
| CN | 102799561 A | 11/2012 |
| CN | 103176945 A | 6/2013 |
| CN | 203435089 U | 2/2014 |
| CN | 103612287 A | 3/2014 |
| CN | 103744713 A | 4/2014 |
| CN | 203705861 U | 7/2014 |
| IE | S20070144 A2 | 11/2007 |
| JP | 3199343 B2 | 8/2001 |
| JP | 3900499 B2 | 4/2007 |
| KR | 100606362 B1 | 7/2006 |

OTHER PUBLICATIONS

Compton, K., et al., (Apr. 2000) "An Introduction to Reconfigurable Computing", *IEEE Computer*, (9 pages).

Compton, K., et al., (Jun. 2002) "Reconfigurable computing: a survey of systems and software", *ACM Computing Surveys*, 34(2), pp. 171-210.

Danne, K., (2004) "Operating systems for fpga based computers and their memory management." *ARCS Organic and Pervasive Computing*, Workshop Proceedings, vol. 41, (10 pages).

Donthi, S., et al., (Mar. 2003) "A Survey of Dynamically Reconfigurable FPGA Devices", In System Theory, Proceedings of the 35th Southeastern Symposium on, IEEE, pp. 422-426.

Ekas, P., et al., (2003), "Developing and Integrating FPGA Coprocessors", *Embedded Computer Design*, (6 pages).

Herbordt, M., et al., (Mar. 2007) "Achieving High Performance with FPGA-based Computing", *Computer*, 40(3), pp. 50-57.

Hill, T., (Jul. 14, 2011) "Advancing the Use of FPGA Co-Processors Through Platforms and High-Level Design Flows", *Xilinx White Paper*, pp. 1-14.

James-Roxby, P., et al., (2000) "Automated Extraction of Rrun-Time Parameterisable Cores from Programmable Device Configurations", In Field-Programmable Custom Computing Machines, IEEE Symposium on, pp. 153-161.

Jean, J. S., et al., (2001) "Query Processing with an FPGA Coprocessor Board", (7 pages).

Jozwik, K., et al., (2013) "Rainbow: An Operating System for Software-Hardware Multitasking on Dynamically Partially Reconfigurable FPGAs", *International Journal of Reconfigurable Computing*, vol. 2013, (36 pages).

Kuon, I., et al., (Feb. 2005) "Design, Layout and Verification of an FPGA Using Automated Tools", In Proceedings of the 2005 ACM/SIGDA 13th International Symposium on Field-Programmable Gate Arrays, ACM, pp. 215-226.

Matoga, A., et al., "An FPGA based Accelerator for Encrypted File Systems", (4 pages).

Microsemi Corporation, (2013) "SmartFusion cSoC: DSP Coprocessor in FPGA Fabric", Application Note AC355, (9 pages).

Soliman, M. I., et al., (2010) "FastCrypto: Parallel AES Pipelines Extension for General-Purpose Processors", *Neural, Parallel & Scientific Computations*, 18(1), pp. 47-58.

Villasenor, J., et al., (1997) "Configurable Computing", *Scientific American*, 276(6), (9 pages).

Walder, H., et al., (Jun. 2003) "Reconfigurable Hardware Operating Systems: From Design Concepts to Realizations", *In Engineering of Reconfigurable Systems and Algorithms*, pp. 284-287.

U.S. Appl. No. 14/693,616, filed Apr. 22, 2015, Systems and Methods for Performing Primitive Tasks Using Specialized Processors.

U.S. Appl. No. 14/693,626, filed Apr. 22, 2015, Systems and Methods for Managing Execution of Specialized Processors.

U.S. Appl. No. 14/693,616, the Office Action mailed Sep. 16, 2015.

\* cited by examiner

STORAGE MANAGEMENT SYSTEMS AND METHODS

FIELD OF INVENTION

In various embodiments, this disclosure relates generally to storage management techniques and, in particular, to storage management techniques for reconfigurable computing devices.

BACKGROUND

Many computers use file management software to access data stored in files stored on storage devices (e.g., hard disc drives (HDDs), solid state drives (SSDs), etc.). The file management software manages requests by applications to open and close files, create and delete files, read data from files, write data to files, etc. To perform these and other file management operations, the file management software may maintain file system records indicating one or more locations in a storage device where a file or parts thereof are stored. When an application requests access to a file or a particular portion thereof, the file management software uses these file system records to determine the address of the requested data on the storage device, transmits the appropriate signals to the storage device to obtain the requested data, and passes the requested data to the application. In various computer systems, the file management operations are typically performed by an operating system running on a general-purpose, programmable processing device (e.g., a central processing unit ("CPU")).

Computer systems generally access data from one or more files during the execution of software applications such as applications for audio/video processing, financial transactions, data mining, etc. The CPU that performs the file management operations may additionally execute one or more software applications, or a computer system may include additional processors for executing the software applications. Some computer systems employ specialized processors such as application specific integrated circuits (ASICs), reconfigurable processing units (e.g., field programmable gate array (FPGA) processing units), etc., for executing the software applications or certain portions thereof. Such specialized processors can be faster and/or more efficient than general purpose processors and, as such, are often used to execute computationally intensive tasks and/or tasks that manipulate large amounts of data (e.g., tens or hundreds of megabytes, gigabytes, terabytes, or even larger sizes of data).

The ASICs and/or reconfigurable (e.g., FPGA-based) processing units generally rely on conventional file management software for accessing data in files stored on storage devices. Therefore, computer systems that include specialized processors typically include a general purpose CPU which executes an operating system with conventional file management software. Generally in such systems, the CPU uses the conventional file management software to obtain data from a storage device on behalf of a specialized processor and may store the data in a memory that is directly accessible to the specialized processor or may supply the data directly thereto. Likewise, after the specialized processor computes a result, the result may be stored in the memory directly accessible to the specialized processor for retrieval by the CPU or may be sent directly to the CPU. The CPU then uses the conventional file management software to store the result in a file stored on the storage device.

Generally in such computing systems, an operating system (OS) maintains file system data that indicates, for each of one or more files, where the files (or portions thereof) are stored and/or are to be stored on one or more storage devices (e.g., a hard disk, SSD, etc.). A file may be stored in a contiguous or non-contiguous set of storage units, often called blocks, in a single storage device or across several storage devices. The file system data typically includes for each file an identifier of the storage device where the file or a portion thereof is stored/to be stored, logical block(s) of file, and physical location(s) (i.e., address(es)) of corresponding physical unit(s)/block(s) of the storage device(s).

One example of a file system well suited for storing and accessing large files (e.g., files of sizes on the order of tens or hundreds of megabytes, gigabytes, terabytes, or more) is an extent-based file system. Extent-based file systems are well known and have widespread use in contemporary computing systems. In an extent-based file system, an extent includes one or more contiguous units/blocks of storage. The extent-based file system allocates one or more extents to a file, which tends to reduce file fragmentation and/or can speed up file access, because an entire large file or at least a significant portion thereof can be stored in a single extent. The allocation of extents often limits the amount of data in the file system directory, as well.

When a processor (e.g., a CPU) needs to access one or more data elements from a file and/or is ready to store such data element(s) in a file, the OS generally determines the logical file block(s) corresponding to such data element(s), computes the physical address(es) corresponding to those logical block(s) using the file system, and accesses and/or stores the data element(s) using the physical address(es). In a computing system that includes one or more specialized processor(s), such specialized processor(s) are typically not configured to generate and/or use file system information and/or to access data using such information. Instead, the specialized processors typically rely on a CPU/OS to perform file access operations, i.e., reading, updating, and/or writing one or more data element(s) from/to a specified file. This may create a performance bottleneck because data processing by the specialized processor(s) becomes dependent on the CPU/OS.

One solution is to configure one or more specialized processors to generate and/or use the file system information and/or to provide file access functionality. This, however, can increase the size, complexity, and/or cost of the specialized processor(s) and may also decrease their performance. Moreover, if only one or a few specialized processors(s) are configured to provide the file access functionality, the performance bottleneck may still exist because other specialized processor(s) that are not configured to provide the file access functionality may need to depend on the specialized processor(s) that are so configured and or on the CPU/OS. If many or all specialized processor(s) are configured to provide the file access functionality, in addition to likely increase in size, complexity, cost, and/or processing time, the specialized processor(s) may also become burdened with coordinating file access functionality among each other.

SUMMARY OF THE INVENTION

In many computer systems, the use of conventional, CPU-based file management software to manage a specialized processor's access to storage devices creates a communication bottleneck, which can significantly hamper the overall system performance. For example, when conventional, CPU-based file management software is used to manage the flow of data between reconfigurable device(s) and storage, in each processing step, the reconfigurable device(s) may be capable of receiving and/or outputting data of size greater than the CPU is capable of providing to and/or receiving from the reconfigurable device(s). For example, a reconfigurable device may receive 128 or 256 bits of data per clock cycle while the CPU may provide only 32 or 64 bits of data per clock cycle. Thus, the system's performance may be constrained by the bandwidth of communication between the reconfigurable devices and the storage.

In addition, the CPU-based file management typically introduces delays in various data transfers. For example, when the reconfigurable device requests data from the CPU, the CPU and the file management software compute the location(s) of the requested data on the storage device. Then, using the computed location(s), the CPU requests the data from the storage device. After the storage device sends the data to the CPU or to a memory, the CPU sends the data to the reconfigurable device or the device can access the data from the memory. The delays associated with these communications are often a significant component of the above-described communication bottleneck.

In applications in which specialized processors, such as reconfigurable devices, ASICs, etc., are used to process large amounts of data, the specialized processors may read large amounts of data from the storage device, may produce and consume large amounts of intermediate data while performing one or more data processing tasks, and/or may store large amounts of intermediate data and/or results in the storage device. This can result in thousands, millions, billions, or even more data access operations between the specialized processor and the data storage. As such, even a relatively short delay on the order of several nanoseconds or milliseconds due to the communication bottlenecks described above can result in a significant delay in the execution of the computationally intensive and/or data intensive tasks. Such delays can therefore make the use of the specialized processors difficult or even impractical, regardless of other benefits offered by such processors.

A need for improvement in the bandwidth and/or latency of communication between specialized processors such as reconfigurable FPGA units and storage devices was recognized. An improved data access system can increase the performance of the computing systems using the specialized processors, particularly for highly-parallel data processing applications and/or applications processing large amounts of data. In various embodiments, improved data access is facilitated, in part, via a specialized storage node manager that allows a specialized processor to read/write data from/to a storage device with little reliance on the CPU and the file management software, thereby enhancing the specialized processor's computational throughput and communication bandwidth. The specialized processor may rely on the CPU to facilitate file access by providing file allocation data indicative of a location in storage of a file from which the storage node manager may read data and/or to which the storage node manager may write data. For example, in a system where the operating system uses an extent-based file system, the operating system may provide a portion of extent data to the storage node manager. The provided portion of extent data may identify the location in storage of a file (or a portion thereof) that is accessible to the storage node manager for reading and/or writing. After the operating system has provided the data identifying the location of the file, the storage node manager may access the file (e.g., read data from the file and/or write data to the file) one or more times without any further intervention from the operating system.

The present disclosure describes hardware-based file management techniques for managing access to storage devices. In some embodiments, these hardware-based file management techniques increase the bandwidth and/or decrease the latency of communication between a specialized processor (e.g., a reconfigurable device) and the storage devices, relative to using CPU-based file management software as an intermediary. A hardware-based storage node manager may be implemented using one or more reconfigurable devices, which can further improve communications between the specialized processor and the storage devices by enabling the storage node manager to adapt to the storage access patterns of the specialized processor. For example, the specialized-hardware-based manager may adapt the sizes of its internal buffers or the sizes of the pages it fetches from the storage devices based on, e.g., the width of the bus coupling the storage from which the data is accessed to the specialized processor, the size of the data elements being accessed by the specialized processor, the rate at which the specialized processor is accessing data elements, the type of processing task (e.g., tasks involving processing of fast streaming data, tasks involving batch processing of a large dataset), etc.

Accordingly, in one aspect, a system for accessing a file is provided. The system is for accessing data from a file on a storage module by the compute architecture given solely a representation of one or more file extents as provided by the operating system (OS). In this fashion, file data itself does not flow through the CPU or operating system; instead, it flows directly from the storage to one or more field programmable gate arrays (FPGA). The system includes a field programmable gate array (FPGA) based storage node manager. The storage node manager is configured to receive an indication of a data element to be accessed. The storage node manager is further configured to compute, using file allocation information, an address of the data element on a storage module whereupon a file comprising the data element is stored or is to be stored. The storage node manager is also configured to provide the computed address to the storage module, for accessing the data element.

In some embodiments, the address of the data element is computed based on a parameter associated with storage nodes managed by the storage node manager. In some embodiments, the parameter includes a number of a storage nodes and/or a sector size of each storage node.

In some embodiments, the file allocation information includes extent information provided by the OS. In some embodiments, the storage node manager stores an extents table, which includes one or more rows corresponding to one or more extents. Each row includes a length field and an address field. The address field stores a computed storage node sector address. In some embodiments, the extent information includes a data length for an extent, and the storage node manager discards at least a portion of data accessed from a storage node using the data length.

In some embodiments, the system includes the storage module. The storage module may include one or more storage nodes. Each of the storage nodes may include a solid-state drive (SSD) or a hard drive. In some embodiments, the storage module includes one or more, e.g., 6, 10, 12, 15, 20, etc., solid-state drives. In some embodiments, the one or more SSDs have a first architecture, and the storage module further includes a carrier board coupled to the one or more SSDs. In some embodiments, the carrier board and the SSD(s) can be swapped with another carrier board coupled to one or more SSDs having a second, different architecture.

In some embodiments, the system includes a non-FPGA based processor configured to access the storage module via the storage node manager.

In some embodiments, the system includes an FPGA-based processing unit and a bus interconnecting the FPGA-based processing unit and the storage node manager. The bus may be used for sending the data element to and/or receiving the data element from the FPGA-based processing unit.

According to another aspect of the present disclosure, a method for accessing a file on a storage module without invoking an operating system (OS) provided data access function is provided. The method is performed by a field programmable gate array (FPGA) based storage node manager. The method includes receiving a portion of file allocation information for the file to be accessed. The method also includes computing, one or more storage node sector addresses corresponding to one or more data elements stored or to be stored in the file. The storage node sector addresses are computed based, at least in part, on (i) the portion of file allocation information and (ii) at least one parameter of a plurality of storage nodes managed by the storage node manager. The method also includes accessing locations of the one or more data elements from the storage module using the one or more storage node sector addresses.

In some embodiments, the at least one parameter is a number of storage nodes and/or a sector size of each storage node.

In some embodiments, the method also includes storing an extents table. The received portion of file allocation information includes extent information provided by the OS, and the extents table includes one or more rows corresponding to one or more extents. Each row of the extents table includes a length field and an address field. The address field stores a computed storage node sector address.

In some embodiments, the method also includes using a data length of an extent to discard at least a portion of data accessed from at least one storage node. The received portion of file allocation information includes extent information provided by the OS, and the extent information includes the data length of the extent.

In some embodiments, the one or more data elements are accessed from a solid-state drive or a hard drive.

In some embodiments, the storage nodes include a first solid-state drive having a first architecture, and the method also includes swapping a second solid-state drive for the first solid-state drive. The second solid-state drive has the first architecture or a second architecture.

In some embodiments, the method includes providing the one or more data elements to a non-FPGA-based processor. In some embodiments, the method includes providing the one or more data elements to an FPGA-based processor or receiving data from the FPGA-based processor via a bus interconnecting the FPGA-based processor and the storage node manager.

These and other objects, along with advantages and features of the embodiments of the present invention herein disclosed, will become more apparent through reference to the following description, the accompanying drawings, and the claims. Furthermore, it is to be understood that the features of the various embodiments described herein are not mutually exclusive and can exist in various combinations and permutations. As used herein, the term "substantially" means±10%, and in some embodiments ±5%.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

A Reconfigurable Computing System

Figure 1:
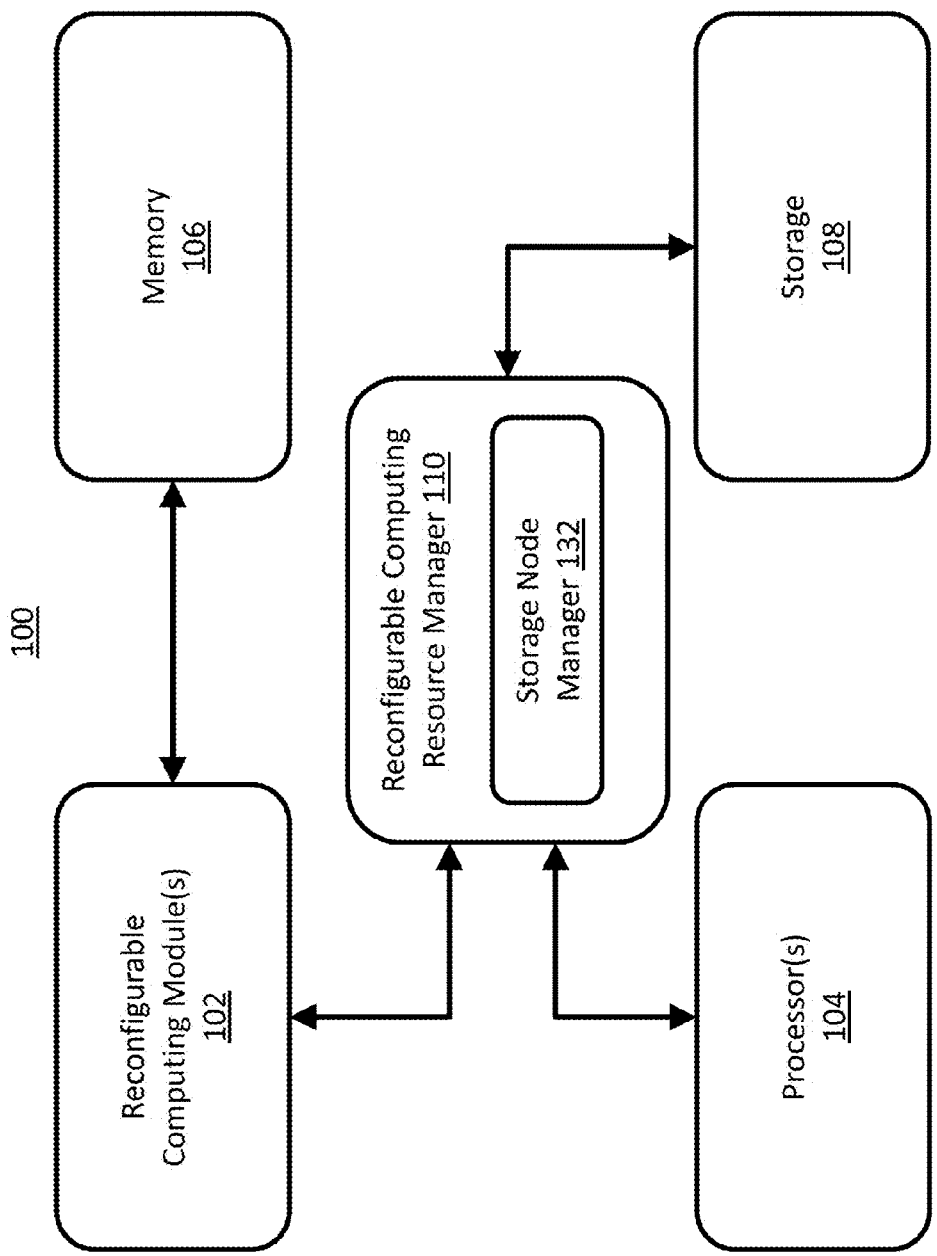
FIG. 1 is a block diagram of a reconfigurable computing system in accordance with some embodiments.

Referring to FIG. 1, in some embodiments a reconfigurable computing system 100 includes one or more reconfigurable computing modules (RCMs) 102, memory 106, storage 108 (e.g., a storage module including one or more storage nodes), one or more processors/CPUs 104, and a reconfigurable computing resource manager 110, which includes a storage node manager 132. The reconfigurable computing module(s) may be reconfigurable, at least in part, to perform different operations in hardware. In some embodiments, an RCM may include at least one programmable logic device (e.g., a generic array logic device (GAL), a complex programmable logic device (CPLD), a field-programmable gate array (FPGA), etc.) and/or any other suitable reconfigurable hardware (e.g., logic fabric and/or interconnection fabric that can be reconfigured to perform different operations).

Compared to general purpose processors, the RCM(s) can provide relatively high performance and/or may consume less power for specialized tasks. In some embodiments, an RCM and its interconnects may be configured to operate at relatively low clock frequencies, e.g., at tens or hundreds of MHz and not at a few GHz, and therefore may require relatively less power. The relatively slow clock speed, however, usually does not adversely affect the system performance, in part because, in some embodiments, an RCM and its interconnects exhibit massive bitwise parallelism. For example, the data paths through the RCM may be tens, hundreds, or even thousands of bits wide. Additionally or in the alternative, the RCMs may operate in parallel, i.e., different RCMs may perform the same or different operations in parallel. The combination of high parallelism and low clock speeds can yield a high performance/power ratio.

The RCM(s) 102 may be coupled to memory 106. Memory 106 may include volatile, read-write memory. In some embodiments, memory 106 may include, without limitation, random access memory (RAM), dynamic RAM (DRAM), static RAM (SRAM), and/or any other suitable type of memory. In some embodiments, memory 106 may be dedicated to RCM(s) 102 (e.g., memory 106 may be accessible to RCM(s) 102, and may be inaccessible to processor(s) 104). The memory 106 may also include several memory modules and a particular memory module or a particular group of memory modules may be associated with a particular RCM. Different RCM(s) can be configured to perform the same or different tasks and a particular RCM may be configured to perform different tasks at different times during the execution of a data processing procedure involving those tasks. Examples of suitable tasks/subtasks include searching (e.g., fuzzy searching, pipelined sliding window searching, or any other suitable searching task), counting (e.g., determining term frequency in a data set, determining a document's word count, etc.), sorting, data compression, data encryption, image processing, video processing, speech/audio processing, statistical analysis, solution of complex systems involving matrices and tensors, etc.

Storage 108 may include non-volatile, read-write memory. In some embodiments, storage 108 includes, without limitation, one or more of flash memory, ferroelectric RAM (F-RAM), magnetic storage (e.g., hard disk), magnetoresistive RAM (MRAM), non-volatile RAM (NVRAM), and/or one or more solid-state drives (SSDs). The storage 108 is generally accessible to the RCM(s) 102 via the reconfigurable computing resource manager 110, and may be accessible to the processor(s) 104, as well. The storage 108 may include several (e.g., 2, 4, 6, 10, 12, 16, 20, 32, 48, 64, etc.) components or nodes. A particular storage node or a particular group of storage nodes may be associated with a particular RCM 102 at a certain time, and with another RCM 102 at a different time. The association between an RCM and one or more storages nodes can change from computation of one task to another and/or between the execution of a pair of subtasks from a set of two or more subtasks associated with a particular task. In some embodiments, storage 108 or nodes thereof are swappable (e.g., hot swappable).

The processor(s) 104 may include one or more processing devices. In some embodiments, processor(s) 104 may include, without limitation, one or more central processing units (CPUs), graphics processing units (GPUs), network processors (NPs), physics processing units (PPUs), microprocessors, microcontrollers, application-specific integrated circuits (ASICs), application-specific instruction-set processors (ASIPs), digital signal processors (DSPs), and/or multi-core processors. In some embodiments, the processor(s) 104 may be programmed to execute an operating system (e.g., Windows, Linux, OS X). The processor(s) 104 may be programmed to access data from the file(s) stored on the storage 108 through the reconfigurable computing resource manager 110. In some embodiments, the processor(s) 104 may communicate with the RCM(s) 102 through reconfigurable computing resource manager 110 and/or through a bus. In some embodiments, the processor(s) 104 can access the memory 106 and/or the storage nodes of the storage 108.

Reconfigurable computing resource manager 110 may be configured to manage one or more resources of reconfigurable computing system 100, including, without limitation, storage 108, RCM(s) 102, input/output (I/O) adapters (not shown), network transceivers (not shown), and/or routing resources among the components of system 100. In addition, the resource manager 110 includes a storage node manager 132 that can manage the storage 108 and/or the nodes thereof, if the storage 108 includes storage nodes. To this end, the storage node manager 132 obtains certain selected portions of the file system information (e.g., extent information) from the processor(s) 104 and/or the operating system executing thereon. The selected portions of the file system information may include a set of starting sectors of file fragments and a corresponding set of contiguous sizes of the file fragments. Using the selected portions of the file system information, the storage node manager 132 can facilitate exchange of data associated with a file between the storage 108 and the memory 106 and/or one or more RCMs 102, without any intervention during the data exchange (i.e., reading data from a file and modifying/writing data to a file), by the processor(s) 104 and/or any operating system executing thereon. In some embodiments, the storage node manager 132 may further control the routing of data between the RCM(s) 102 and the storage 108, and/or between the memory 106 and the storage 108.

In some embodiments, resource manager 110 includes a reconfiguration controller that can configure one or more of the RCMs 102 to perform a specified task. In some embodiments, the reconfiguration controller may initiate reconfiguration of one or more RCMs 102 without the intervention of processor(s) 104 (e.g., in response to detecting suitable conditions). In some embodiments, resource manager 110 includes a communications manager configured to manage the VO resources (not shown) and/or networking resources (not shown) of system 100. In some embodiments, the I/O manager may manage, without limitation, a display adapter, an audio adapter, a network transceiver, and/or any other suitable I/O or network resource. In some embodiments, the RCM(s) 102 may be configured to use the system's communications resources through the communication manager, without relying on any of the processor(s) 104 and/or the operating system executing thereon. The processor(s) 104 may also access the system's communications resources through the operating system.

Figure 2:
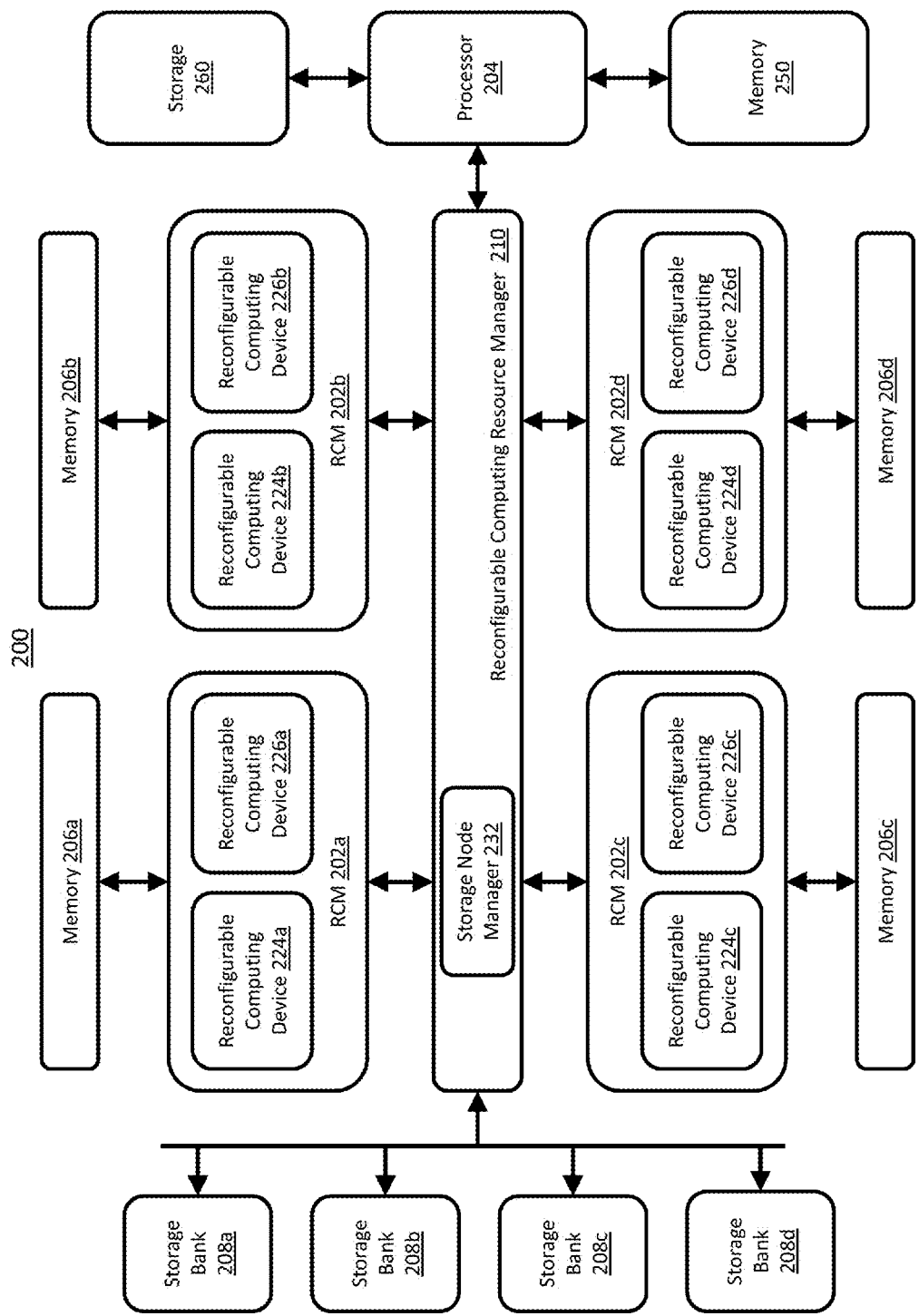
FIG. 2 is an architectural illustration of a reconfigurable computing system in accordance with some embodiments.

In some embodiments, the components of a reconfigurable computing system 200 are arranged according to an architecture shown in FIG. 2. The reconfigurable computing system includes four reconfigurable computing modules (RCMs) 202 coupled to respective memories 206 and to a reconfigurable computing resource manager 210. The resource manager 210 is coupled to one or more storage banks 208 (e.g., one, two, four, six, eight, or more than eight storage banks) and to a processor 204, which is coupled to memory 250 and storage 260.

Each RCM 202 includes two reconfigurable computing devices 224 and 226. The reconfigurable computing devices may operate in parallel (e.g., may perform the same operations or different operations in parallel), and/or may be configured to perform bitwise parallel operations. Typically, each reconfigurable computing device includes one or more reconfigurable modules (e.g., FPGA units). A memory 206 may include any suitable type of memory device arranged in any suitable configuration. In some embodiments, a memory 206 may include tens, hundreds, or thousands of gigabytes (GB) of RAM, arranged in any suitable number of memory modules and/or banks.

Each storage bank 208 can include one or more storage nodes of the same or different types, such as conventional disk drives, optical drives, etc. In one embodiment, the storage nodes in a storage bank are solid-state drives (SSDs) such as mSATA SSDs or M.2 SSDs. In some embodiments, a storage bank may accommodate swapping (e.g., hot swapping) of SSDs having different form factors. For example, a storage bank may allow replacing one or more mSATA SSDs with one or more M.2 SSDs, and vice versa. For example, in some embodiments, each storage bank may include a carrier board suitable for coupling to one type of SSD, and the swapping of a storage bank's SSDs may be facilitated by swapping a storage bank's carrier board with a different carrier board suitable for coupling to a different type of SSD. The ability to swap SSDs of different form factors may enhance the computing system's resilience to disruptions in the supply chains of mSATA SSD manufacturers and M.2 SSD manufacturers. Each storage node may have any suitable capacity, including, without limitation, capacities ranging from 128 GB through 2 TB, or higher. Storage nodes having smaller capacities, e.g., 64 MB, 128 MB, 1 GB, 2 GB, 4 GB, 8 GB, 32 GB, etc., may also (or alternatively) be included.

The storage nodes in one or more storage banks may be logically grouped together to form an FPGA-controlled redundant array of independent drives (RAID). As one example, the system 200 may include eight storage banks, with each storage bank including six storage nodes, and the storage banks may be paired to form four RAID devices, such that each RAID device includes twelve storage nodes. In some embodiments, data stored on the storage nodes may be striped, such that data associated with a file or contiguous portions of such file data are stored on different storage nodes. Striping the data in this manner may yield high aggregate bandwidth for accessing/sending such data from/to the storage bank(s) 208. The storage 208 (e.g., the storage nodes) may communicate with resource manager 210 using any suitable interface, including, without limitation, serial ATA (SATA), parallel ATA (PATA), eSATA, SCSI, serial attached SCSI (SAS), IEEE 1394 (Firewire), USB, Fibre Channel, InfiniBand, Thunderbolt, and/or Ethernet (e.g., 10 Gigabit Ethernet, 40 Gigabit Ethernet, 100 Gigabit Ethernet, any other Ethernet standard that is available now or may become available, including, but not limited to, 400 Gigabit Ethernet, etc.). In some embodiments, each storage node includes an SSD, and the storage nodes may be accessed in parallel.

In various embodiments, one or more storage banks may include any number (e.g., 2, 4, 5, 6, 8, 10, 12, or more than 12) of storage nodes. In some embodiments, the storage banks collectively include up to 48 storage nodes, though more than 48 storage nodes are also possible. The number of storage nodes in the storage banks may be selected such that the aggregate input/output (I/O) bandwidth of the storage nodes is approximately equal to the aggregate data-processing bandwidth of the computing system's RCMs 202. The number of storage banks and/or the number of nodes in one or more banks may be selected to improve or maximize parallel data exchange between the RCMs 202 and the storage 208 or storage nodes, so that the RCMs 202 can be engaged in data processing up to their processing capacity without letting the I/O become a bottleneck.

The processor(s) 204 can access data from one or more files stored on any of the storage banks 208 via a storage node manager 232. This access by the processor is generally independent of the ability of the RCM(s) 202 to efficiently receive data from a file stored on the storage 208 and/or store data in a file on the storage 208, through a storage node manager 232 without intervention by the processor(s) 204 and/or an OS executing thereon. The processor(s) 204 may communicate with RCM(s) 202 through resource manager 210 and/or through a system bus (not shown). Memory 250 and/or storage 260 may be dedicated to processor(s) 204 and may not be accessible to the resource manager 210 or to the RCM(s) 202.

Resource manager 210 may be configured to manage one or more resources of the reconfigurable computing system, including, without limitation, storage banks 208, RCMs 202, input/output (I/O) resources (not shown), network resources (not shown), and/or routing among the resources of the system. In various embodiments, the resource manager 210 includes a storage node manager 232, which may be configured to access data from files in storage banks 208 without invoking the data access functions of an operating system (OS) executing on processor(s) 204. In some embodiments, the storage node manager 232 may control the routing of data between the RCMs 202 and storage banks 208, between the processor(s) 204 and storage banks 208, and/or between memories 206 and storage banks 208.

In some embodiments, resource manager 210 may include a reconfiguration controller. The reconfiguration controller may be adapted to control reconfiguration of the RCMs 202. For example, the reconfiguration controller may be adapted to control reconfiguration of the reconfigurable computing devices (224, 226), and/or to control reconfiguration of the interconnects within or between the reconfigurable computing devices. In some embodiments, such reconfiguration can result in different protocols and/or different line rates between the reconfigurable computing devices. In some embodiments, processor 204 may request that the RCMs 202 perform a task by sending a suitable request to the reconfiguration controller, and the reconfiguration controller may configure one or more of the RCMs 202 to perform the task. In some embodiments, the reconfiguration controller may configure one or more RCMs 202 to perform multiple tasks. In some embodiments, the reconfiguration controller may initiate reconfiguration of one or more RCMs without the intervention of processor 204. In some embodiments, instead of being separate from the RCMs 202, the reconfiguration controller 210 may be contained within one or more RCMs 202.

In some embodiments, resource manager 210 may include a communications manager. The communications manager may be configured to manage the I/O resources (not shown) and/or network resources (not shown) of the reconfigurable computing system. In some embodiments, the RCMs 202 may be configured to use the system's I/O resources and/or network resources through resource manager 210, without the intervention of the processor 204 or its operating system.

Embodiments of architecture 200 are not limited by the numbers of components shown in FIG. 2. In some embodiments, a reconfigurable computing system arranged in architecture 200 may include any suitable number of RCMs 202 (e.g., one, two, three, four, or more than four RCMs). In some embodiments, different RCMs may include the same number of reconfigurable computing devices or different numbers of reconfigurable computing devices. An RCM may include, for example, one, two, or more than two reconfigurable computing devices. In some embodiments, the system may include any suitable number of storage banks (e.g., eight, fewer than eight, or more than eight), and each storage bank may include any suitable number of storage nodes (e.g., six, fewer than six, or more than six). In some embodiments, the system may include more than one processor 204.

Figure 3:
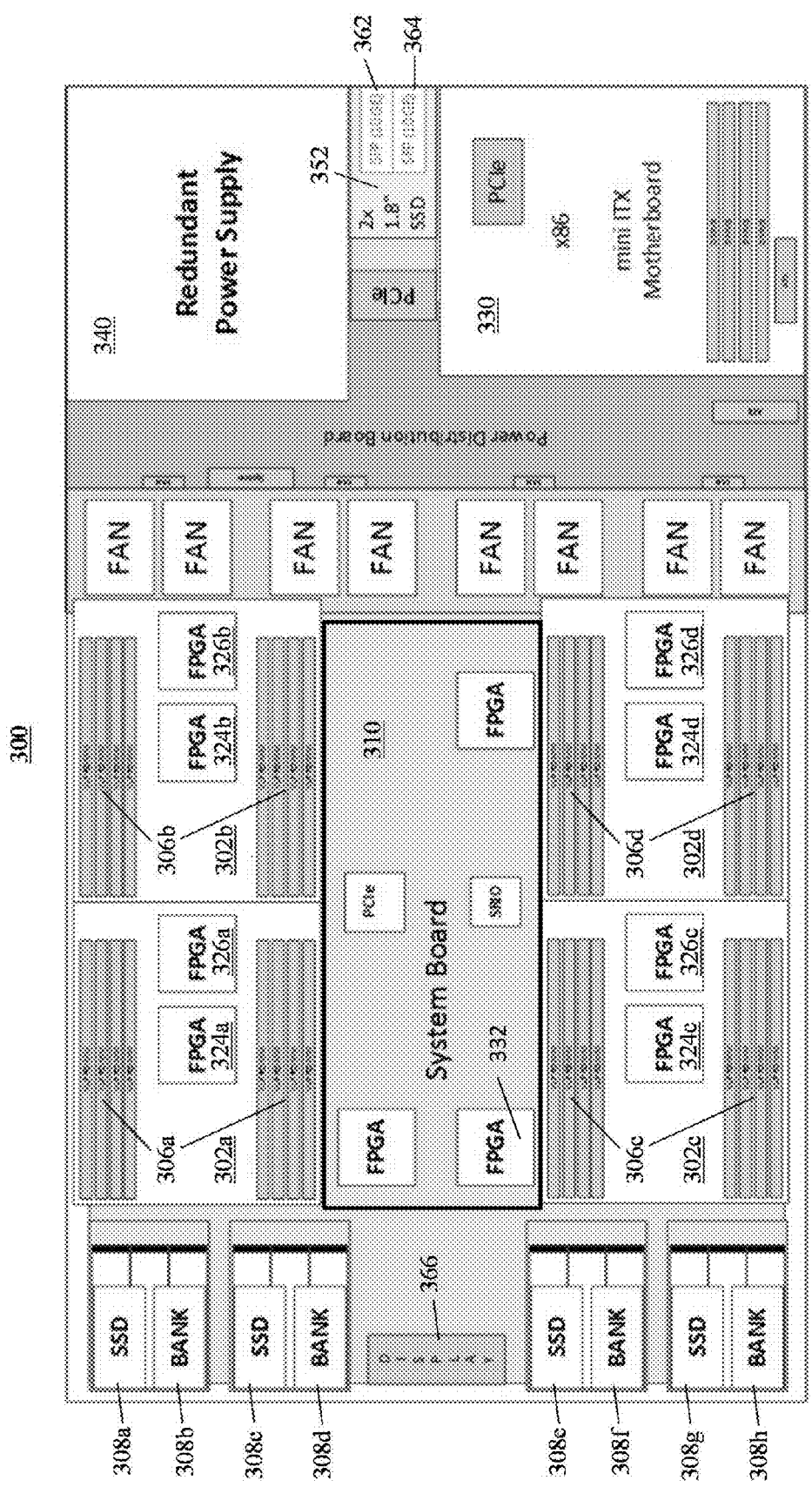
FIG. 3 schematically illustrates a reconfigurable computing system in accordance with some embodiments.

Referring to FIG. 3, in some embodiments a reconfigurable computing system 300 arranged in accordance with architecture 200 may be implemented as a one rack unit (1U) device. The 1U device may be approximately 19 inches wide by 32 inches long by 1.75 inches thick. As can be seen, system 300 includes four reconfigurable computing modules (RCMs) 302 coupled to four corresponding memories 306, eight SSD banks 308, a reconfigurable computing resource manager 310, a motherboard 330, a power supply 340, storage 352, network transceivers 362-364, and display adapter 366, all of which are arranged on a system board.

Each RCM 302 includes two FPGAs 324 and 326, and the memory 306 coupled to each RCM includes up to eight memory modules (e.g., dual in-line memory modules). In some embodiments, the RCMs may include more than eight memory modules. The resource manager 310 includes three FPGAs, a PCIe switch, and a serial RapidIO (SRIO) switch. In some embodiments, one or more of the resource manager's components (e.g., the storage node manager, the reconfiguration controller, and/or the communications manager) may be implemented using one or more of the resource manager's FPGAs. For example, a storage node manager 332 may be implemented using one FPGA, as shown in FIG. 3, or more than one FPGA (not shown). In some embodiments, resource manager 310 may use either the PCIe switch, or the SRIO switch, or both, to control the data flow between the SSD banks 308 and the RCMs 302, and/or between the SSD banks 308 and the memories 306. In some embodiments, resource manager 310 may use the PCIe switch, the SRIO switch, or both, to communicate with motherboard 330, with network transceivers 362-364, and/or with any other suitable component of system 300. By communicating with network transceivers 362-364, resource manager 310 may control communications between system 300 and other computing devices (e.g., other reconfigurable computing systems). Any suitable network transceivers 362-364 may be used, including, without limitation, SFP+, QSFP+, CXP, CFP, CFP2, CFP4, and/or InfiniBand. In some embodiments, network transceiver 362 may be coupled to a user network for communication with user devices. In some embodiments, network transceiver 364 may be coupled to a cluster network for communication with other reconfigurable computing systems.

Display adapter 366 may be coupled to any suitable display device, including, without limitation, an LED display, an LCD display, an e-paper display (e.g., an electrophoretic display), and/or a touchscreen display. In some embodiments, resource manager 310 may be configured to control display adapter 366, such that data from the RCMs 202, memories 306, and/or SSD banks 308 (including, but not limited to, results of data analysis operations or results of system analysis operations) may be displayed by the display device without intervention by motherboard 330 or by any operating system executing thereon. In some embodiments, motherboard 330 may be coupled to display adapter 366, such that the motherboard's processor may control the display adapter.

Motherboard 330 may be any commercially available motherboard. A processor may be coupled to the motherboard, and the processor may execute an operating system (e.g., Linux). The processor may have on-chip memory (e.g., cache memory). In some embodiments, additional off-chip memory may be coupled to motherboard 330. The off-chip memory may be dedicated to the motherboard. In some embodiments, motherboard 330 may be coupled (e.g., by PCIe adapter) to storage 352, to network transceivers 362-364, and/or to storage banks 308.

Power supply 340 may include dual redundant universal AC power supplies of any suitable type (e.g., 100 VAC-240 VAC, 50 Hz-60 Hz). In some embodiments, the system 300 may include one or more fans, e.g., eight hot-swappable fans.
Hardware-Based Storage Management Referring back to FIGS. 1-3, the resource managers 110, 210, 310 include a hardware-based storage node manager (e.g., the storage node manager 132 shown in FIG. 1, 232 shown in FIG. 2, and 332 shown in FIG. 3). In some embodiments, the hardware-based storage node manager is an FPGA-based storage node manager, i.e., at least a portion of the storage node manager is implemented using one or more FPGAs. For simplicity, the description of hardware-based storage management herein refers primarily to a computer system having an architecture 200 shown in FIG. 2. It should be understood, however, that the techniques described herein are also applicable to the corresponding components of FIGS. 1 and 3. Also for simplicity, the storage management is described in terms of accessing a file or data associated therewith. Accessing, as used herein, includes not only reading data associated with a file or portions of such data from the storage or one or more storage nodes included in the storage, but also updating such data or portions thereof on the storage/nodes, and/or writing/storing data or portions thereof to the storage/storage nodes.

It is described above that file data access in conventional computing systems using specialized processors is facilitated using a CPU/OS and, to this end, the OS generally provides file management functionality, and generates and maintains file management data. It is also described that using a CPU/OS to access file data generally creates a performance bottleneck. The use of CPU/OS for accessing file data in computing systems such as those described with reference to FIGS. 1-3 presents an additional challenge.

In particular, these systems generally include several storage nodes to provide fast, parallel data access to one or more specialized processors, e.g., RCMs, using, e.g., one or more buses, interfaces, etc. It is described that the number of storage modules/banks and the number of storage nodes included in one or more storage modules/banks may be configured according to the processing and/or aggregate I/O capacity of the specialized processors/RCMs (e.g., to maximize utilization thereof). While the OS can be configured to manage and access file data from several storage nodes (such as the storage nodes in an RAID system, for example), if the storage subsystem is customized as described above, the OS may also need to be customized and/or adapted to provide file management for that customized storage subsystem and to access data therefrom. This may be cumbersome or even infeasible.

Moreover, the CPU generally cannot access data in parallel from a large number of storage nodes and, in general, must access such data sequentially. Therefore, if a CPU/OS is used for file data access, different specialized processors (e.g., RCMs) generally cannot access data from the several storage nodes in parallel, via buses/interfaces of selectable widths. As the specialized processors may need to wait for the CPU/OS to access file data sequentially, the collective processing power of the specialized processors/RCMs may be underutilized. Various disadvantages of implementing a file system on one or more specialized processors are also described above.

In order to maximize the utilization of the RCMs 208, the storage node manager 232 facilitates file data access between storage 208 and the RCMs 202 and/or memory 206 without relying on the CPU 204 and the OS executing thereon during data read/update/write operations, while employing the OS for file management, so that neither the storage node manager 232 nor any RCM 202 needs to implement a file management system. In addition, the storage node manager 232 accesses only a certain portion of the overall file management data from the OS and manipulates the file management data so that the OS need not be customized substantially according to the structure of the storage 208 in terms of the number of banks and/or nodes.

In general, the storage 208 may include "$N_B$" banks and each bank may include "$N_{sn}$" storage nodes. The $N_{sn}$ storage nodes may be partitioned into $N_G$ groups, where $N_G \geq 1$. In some embodiments, each group includes the same number of storage nodes, denoted $N_{sn}^G$, where $N_{sn} = N_G \times N_{sn}^G$. Data may be accessed (access including reading, updating, and/or writing data, as described above), from each storage node in multiples of a storage unit, e.g., storage node sector. The size in bytes of a storage node sector may be denoted as $S_{ns}$. The file data may be striped across the storage nodes of a single group of a single bank, or across the storage nodes of two or more (or all) groups of a single bank. Additionally or alternatively, the file data may be striped across the storage nodes of some or all of the groups of two or more banks, e.g., across the storages nodes of both groups of one bank and across the storage nodes of only one of the two groups of another bank. Only for the sake of simplicity, the description herein considers that the file data is striped across all AT storage nodes of a single bank. Thus, file data may be accessed from the storage 208 in multiples of another storage unit called storage module sector. The size in bytes of the storage module sector, denoted $S_{ms}$, is given by $S_{ms} = N_{sn} \times S_{ns}$. In general, may represent a specified or selected number of storage nodes across which the file data is to be striped.

As an illustrative, but non-limiting example, in one embodiment, the number of storage banks is $N_B = 4$, and the number of groups per bank $N_G=2$. The number of storage nodes per group $N_{sn}^G=6$ and, as such, the number of storage nodes per bank $N_{sn}=12$, for a total of 48 storage nodes. The storage node sector size $S_{ns}=512$ bytes and, as such, the storage module sector size $S_{ms}=6144$ bytes, i.e., 6 Kbytes. In other embodiments, the number of storage banks $N_B$ can be any number (e.g., 1, 2, 3, 5, 6, 8, 10, 12, 16, 20, 32, or more), and the number of groups per bank $N_G$ can also be any number (e.g., 1, 2, 3, 5, 6, 8, or more). Similarly, the number of storage nodes per group $N_{sn}^G$ can be any number (e.g., 1, 2, 3, 5, 6, 8, 10, 12, 16, 20, 32, 40, 48, 64, or more) and, as such, each of the number of storage nodes per bank $N_{sn}$ and the total number of storage nodes can be any number (e.g., 1, 2, 3, 5, 6, 8, 10, 12, 16, 20, 32, 40, 48, 64, or more). In some embodiments, one or more (or all) of these numbers are powers of two while in other embodiments one or more (or none) of these numbers is a power of two. In various embodiments, the storage node sector size $S_{ns}$ can be fewer or more than 512 bytes (e.g., 64, 128, 1 K, 2K, 4K bytes, etc.) and, correspondingly, the storage module sector size $S_{ms}$ in bytes can be any number (e.g., 2 K, 4K, 8 K, 10 K, 16 K, 32 K or more).

In various embodiments, the OS provides the file management functionality according to the storage module sector size $S_{ms}$ and independently of the particular structure of the storage module in terms of the number of storage banks ($N_B$), the number of groups per bank ($N_G$), the number of storage nodes per group ($N_{sn}^G$), the number of storage nodes per bank ($N_{sn}$), the total number of storage nodes, and/or the storage node sector size ($S_{ns}$). Thus, the resource manager 210 and/or the storage node manager 232 can configure the storage 208 to include any suitable values of $N_B$, $N_G$, $N_{sn}^G$, $N_{sn}$, the total number of storage nodes, and/or the storage node sector size ($S_{ns}$), such that the parallelization of data access between the storage 208 and the RCM(s) 202 and/or memory modules (206), and utilization of the RCM(s) 202 is maximized, without needing substantial reconfiguration or customization of the OS. Regardless of any selected storage configuration, the OS views the storage 208 as having a particular storage module sector size $S_{ms}$ (e.g., 6 Kbytes in the example described above), and generates and maintains the file management data and provides the file management functionality according to $S_{ms}$.

In typical operation of a system having an architecture depicted in FIG. 2, several files may be stored on and accessed from the storage 208. The sizes of different files can change, i.e., grow or shrink, during the course of operation, and the order in which the files are accessed during operation can be different than the order in which the files are created, and some files may be deleted. As such, the data of a single file is often not stored in a single contiguous portion on the storage 208. Instead, the file data is typically fragmented into several portions and these portions are interleaved with data from one or more other files. Some extent based and other file systems can reduce fragmentation but data fragmentation generally exists, especially when file sizes are large, such as tens or hundreds of megabytes or gigabytes, or even more. In order to manage and access file data efficiently, an OS may generate and maintain a complex data structure for file management data. Such a data structure may include pointers, trees, hash tables, etc.

The OS may allocate one or more extents to each file, where each extent is a contiguous portion of the storage, and the size of the contiguous portion can be a multiple of the storage module sector size $S_{ms}$, or a block size that is related to $S_{ms}$. The different extents, however, are generally non-contiguous portions of the storage and may have different sizes. Therefore, the OS generally maintains for each extent allocated to a file a starting address of the extent and a length of the extent specified in a suitable unit such as the number of bytes, number of blocks, number of sectors, etc.

Figure 4:
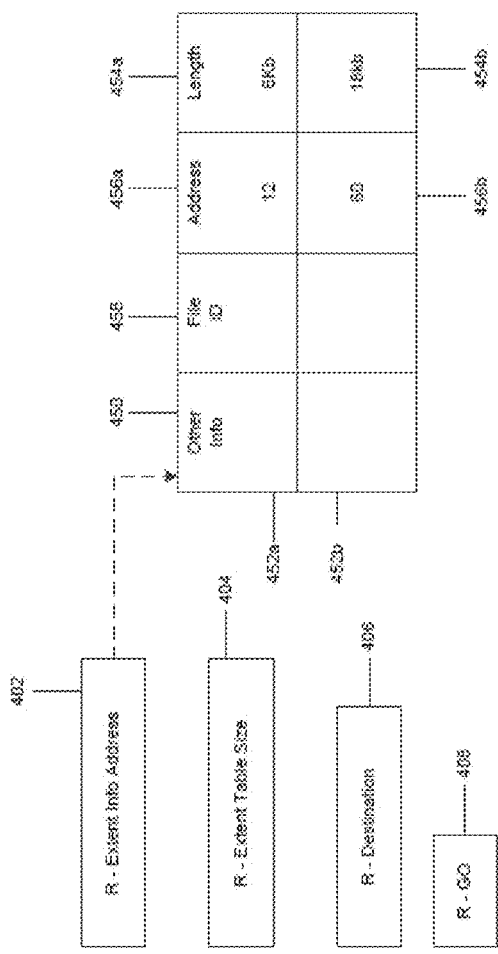
FIG. 4 schematically depicts extent-based information maintained by a hardware-based storage manager for a storage module including two or more storage nodes, according to one embodiment.
Figure 4:
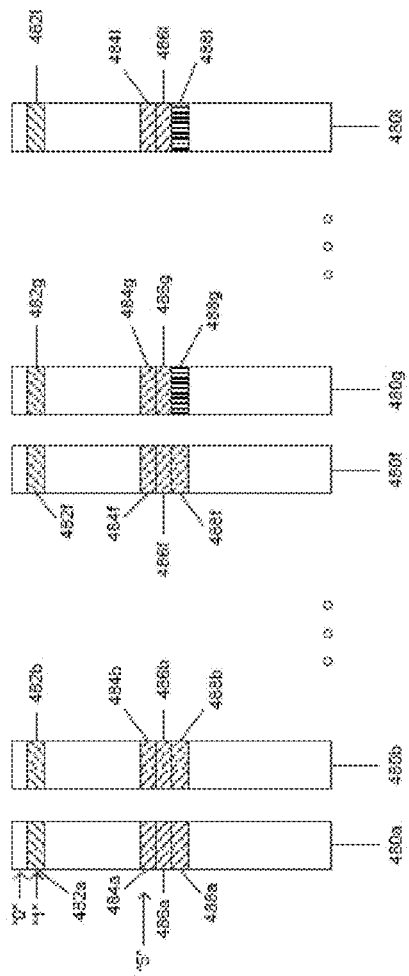

To illustrate, $S_{ms}$ may be 6 Kbytes (as described in one example above) and two extents may be allocated to a file File_A. In this example, the starting address of the first extent is 6 K (storage node sector 12 in the example of FIG. 4), and the size thereof is 6 Kbytes i.e., a single sector of the storage module. The starting address of the second extent is 30 K (storage module sector 60 in the example of FIG. 4) and the size thereof is 15 Kbytes. As such, the second extent occupies three consecutive sectors of the storage module. The first two of these are occupied completely, and the third sector is occupied only partially. The starting addresses and extent sizes are illustrative only. The number of extents can be any number such as 1, 2, 3, 5, 6, 7, 10, 11, etc., and the number of extents associated with different files can be different. For each extent, the OS may also maintain additional information such as a file identifier, logical starting block of the file, etc.

In order to access data from a particular file, the storage node manager 232 does not generate or access from the OS the entire data structure that stores the overall file management data that is generated and maintained by the OS. Instead, with reference to FIG. 4, the storage node manager 232 obtains, from the OS, selected extent-related information for the file to be accessed, manipulates the received information as described below, and stores the modified information in an extents table 450, for subsequent use during file access. The size of the information corresponding to each extent that is maintained by the OS can be expressed as a parameter ExtentInfoSize. The ExtentInfoSize can be specified in terms of a number of bytes (e.g., 16, 32, 40, 64, 80, 128 bytes, etc.), or in terms of any other suitable unit. In order to store information about all of the extents of a file to be accessed, in some embodiments, the size of the extents table (e.g., the table 450) that is maintained by the storage node manager 232 can be expressed as the number of extents of a file times ExtentInfoSize. The extents table size can be specified in number of bytes or in any other suitable unit.

In some embodiments, the storage node manager 232 stores an address of extents information data (e.g., an address of the extents table 450) corresponding to a file to be accessed (e.g., File_A) in the register R_ExtentInfoAddress 402. The storage node manager 232 may also receive from the OS the number of extents allocated to the file to be accessed and ExtentInfoSize for each extent, and store in a register R_ExtentTableSize 404 the size of the extents table (e.g., the table 450) as the number of extents of a file times ExtentInfoSize. As such, each row of the table 450 represents a particular extent of the file to be accessed, and all rows have the same size specified by the parameter ExtentInfoSize. As one example, for the file File_A the storage node manager 232 would store the address of the extents table 450 in the register R_ExtentInfoAddress 402. If ExtentInfoSize for the extents of the file File_A is 64 bytes, the storage node manager would store 128 bytes (i.e., 2*64 bytes) in the register R_ExtentTableSize 404, indicating that the table for File_A (e.g., the table 450) would have two rows 452a, 452b, corresponding to the two extents of the file File_A. Each row of the extents table 450 may include a Length field 454 to indicate the size of that extent (e.g., in bytes) that is actually used by the file data, and an Address field 456 identifying the starting address of the extent. Each row 452 may also include one or more additional fields, e.g., a file identifier 458, etc.

In some embodiments, the storage node manager 232 also obtains from the CPU 204, the OS executing thereon, and/or from one of the RCMs 202, the destination for the file data to be accessed from the storage 208. The destination can be an RCM 202, the memory 206 associated therewith, the CPU/OS 204, the memory 250, and/or the storage 260. The destination information may be stored in a register R_Destination 406. Once the information described above is received in various registers 402-406, the CPU/OS 204 and/or the resource manager 210 may set a flag or a register R_GO 408, allowing the storage node manager 232 to perform data access.

As described above, the OS generally provides the file management functionality including the extents based allocation according to the storage module sector size $S_{ms}$, and independently of the particular structure of the storage module in terms of the number of storage banks ($N_B$), the number of groups per bank ($N_G$), the number of storage nodes per group (Ni), the number of storage nodes per bank ($N_{sn}$), the total number of storage nodes, and/or the storage node sector size ($S_{ns}$). As such, the OS provides the starting address of each extent according to the storage module sector size $S_{ms}$. To illustrate, in one example the starting addresses for the two extents of the file File_A as provided by the OS are 6 K and 30 K, respectively, as described above. In general, the OS may provide the starting address of the extent as an address in bytes, as an address in sectors of the storage module, etc. Depending on the particular architecture of the storage module in terms of the number of storage nodes, a sector of a storage module as a whole may not correspond to the sectors of individual storage nodes.

The storage node manager 232, however, has all the information about the specific configuration of the storage 208 in terms of $N_B$, $N_G$, $N_{sn}^G$, $N_{sn}$, the total number of storage nodes, and/or the storage node sector size ($S_{ns}$). As such, in order to access the file data from a selected set of $N_{sn}$ storage nodes across which the file data are to be striped, the storage node manager 232 coverts the stating address of each extent, whether specified in terms of bytes or sectors of the storage module as a whole, into a starting address in terms of the sectors of the storage nodes. To illustrate, in the foregoing example where $N_{sn}$=12 and the storage node sector size $S_{ns}$=512 bytes, the starting address 6 K of the first extent is divided by $S_{ns}$ to obtain the corresponding starting storage nodes sector address as 12.

The storage node manager 232 then divides the starting storage nodes sector address by $N_{sn}$ to obtain a starting sector address in each storage node, and uses this converted sector address for data access to each of the storage nodes. To illustrate, in the forgoing example, the file data is striped across $N_{sn}$ storage nodes (e.g., 12 storage nodes 480a-480l). The starting sector address of each storage node is therefore 12/12=1, i.e., the file data represented by the first extent can be accessed by accessing data from sector address "1" of each of the $N_{sn}$ (e.g., 12) storage nodes 480a-480l. In various embodiments, the starting address(es) of extent(s) may be stored by the storage node manager 232 in the Address field(s) 456 of the extents table 450 in bytes, storage module sectors, or storage node sectors.

In the foregoing example, the starting addresses of the two extents, as provided by the OS, are expressed in bytes. In some embodiments, the OS may express the starting address of an extent in storage module sectors. In the example above, the starting addresses of the first and second extents, when expressed as storage module sectors, are 1 and 5, respectively. Likewise, other components that access the storage module via the storage module manager (e.g., the RCMs) may specify the address of an extent in bytes or in storage module sectors. In some embodiments, a component that provides the address of an extent to the storage module manager may also provide a parameter indicating whether the extent address is specified in bytes or in storage module sectors. In some embodiments, the OS may express the extent address in storage module sectors, and the RCMs may express the extent address in bytes. In cases where the OS, an RCM, or some other component is configured to specify an extent address in storage module sectors, the reconfigurable computing system may provide that component with data indicating the size of a storage module sector, without necessarily providing that component with data indicating the other parameters of the storage module.

The length in bytes of the file data to be accessed from the first extent is specified by the Length field 454 of the corresponding row 452 in the extents table 450. The storage node manager 232 can divide this length by the storage node sector size ($S_{ns}$) and further by $N_{ns}$ (i.e., the number of storage nodes across which the file data are to be striped), to identify the number of sectors to be accessed from each storage node. In the foregoing example, the Length field 454 of the first extent is 6 Kbytes and (6 Kbytes/(512 bytes*12)=1). Therefore, the storage node manager 232 would access one sector of each storage node 480a-480l, starting from the sector address "1." The data from the sectors 482a-482l of the storage nodes 480a-480l can be accessed in parallel.

In the foregoing example, the starting address of the second extent of the file File_A, as provided by the OS is 30 K. Therefore, using the values of the parameters $S_{ns}$ and $N_{sn}$, the storage node manager 232 can determine that data from the sector 60 is to be accessed and may store the sector address 60 in the Address field 456b. This sector address corresponds to sectors at address "5" of each of the $N_{sn}$ (e.g., 12) storage nodes 480a-480l, since 60 divided by 12 is 5. Furthermore, if the length in bytes as specified by the Length field 454b is 15 K, the storage manager 232 would also determine that to access 15 Kbytes of file data, data from three sectors of each storage node, namely 484a-484l, 486a-486l, and 488a-488l must be accessed. As this would result in a total of 18 Kbytes of data, the storage manger 232 may discard data accessed from the sectors 488g-488l, after it has been accessed. As such, the data access from the striped storage nodes can be uniform and not dependent on the actual number of bytes to be accessed. The storage node manager 232, however, can truncate the accessed data as necessary, using values of the various parameters described above, and provide only the relevant data to the specified destination.

Thus, in various embodiments, the OS can maintain the overall file system and generate extents based information for each file generally independently of the structure of the data storage. The storage node manager accesses only specific extents information from the OS, manipulates that information according to the structure of the data storage, and then facilitates access to the data of one or more files without needing further involvement of the CPU/OS. Thus, the bottleneck described above can be avoided or significantly reduced, without burdening the RCMs. The structure of the storage can be optimized to increase parallel access to the data and/or to increase the performance of the RCMs, without needing substantial corresponding customization of the OS.

In various embodiments, data of a file is read from the storage and may be provided to one or more RCMs and/or to memory units associated therewith. Alternatively or in addition, the read data may be provided to the CPU(s)/OS. In some embodiments, one or more RCMs and/or CPU(s) may update the data of the file by replacing old data values with new ones. In some embodiments, the RCM(s) and/or the CPU(s) may generate new data and/or may delete existing file data, causing the file size to change. In such cases, the OS may update the extents information as necessary, and the storage node manager may use the updated extents information, e.g., to store new data in the file. In some embodiments, an RCM may be configured to store data in a new file. As such, the OS may generate extents information for the new file and the storage node manager may use that extents information, allowing the RCM to store the data in the new file. The data in the newly generated file may be used by one or more other RCMs and/or by the CPU(s)/OS. Some embodiments include more than one storage node manager. For example, a dedicated storage node manager may be associated with each storage bank.

In various embodiments, the operating system running on processor(s) 204 employs an extent-based file system such as e.g., ext2, ext3, ext4, XFS, NTFS, HFS, HFS+, or any other extent-based file system for data stored in the storage 208. Extents information may be accessed by the storage node manager 232 from other extents based files systems, including those that may be developed in the future via a suitable interface. In some embodiments, the extent information is obtained from the OS by the storage node manager 232 using various standard techniques. In one embodiment, a fiemap( ) system call is used, which both the operating system and extent-based file system support. The fiemap( ) system call is an I/O control (ioctl) method allowing a program running in user space to retrieve file extent mappings.

The storage node manager 232 as described herein is generally light weight, i.e., the storage node manager 232 may not perform a number of functions of a typical file manager, or of the overall memory management subsystem of an operating system. Instead, the storage node manager 232 uses extent lists represented as starting sectors and contiguous sizes to read and write data without operating system interference, which allows for rapid analysis of the data and rapid writes of results of that analysis back to the storage 208. In this way, in various embodiments, the storage node manager 232 can facilitate fast and efficient exchange of data between one or more specialized processors (e.g., RCMs 202) and one or more storage devices/nodes included in the storage 208.

Returning to FIG. 3, the hardware-based storage node manager 332 includes provisions for reading data from and writing data to one or more storage devices/nodes. Storage node manager 332 may use any interface suitable for communicating with the computing system's storage node(s), including, without limitation, serial ATA (SATA), parallel ATA (PATA), eSATA, SCSI, serial attached SCSI (SAS), IEEE 1394 (Firewire), USB, Fibre Channel, Infiniband, Thunderbolt, and/or Ethernet (e.g., 10 Gigabit Ethernet, 40 Gigabit Ethernet, 100 Gigabit Ethernet, etc.). When the address of a storage access request has been determined, the storage node manager communicates the appropriate request (e.g., a read request or a write request) and the corresponding data (e.g., the address for a read request, or the address and the data to be stored for a write request) to the storage node(s).

In one embodiment, large-scale data striping (similar to RAID 0 architecture) for both read and write access is possible independent of operating system and processor(s) (e.g., the processor(s) 204 shown in FIG. 2), whereby the OS specified starting addresses in the extent lists and their respective contiguous sizes are provided to, and modified and managed by the hardware storage node manager 332, as described above with reference to FIG. 2. As such, the same starting sector can be used across a large number of storage devices/nodes in each storage module/bank (e.g., 308a-h), and the requested size can be split amongst the devices/node in each storage module/bank. Specifically, in various embodiments, the storage node manager performs modulo arithmetic given the size of the storage bank and the extent list size(s) as provided by the processor(s)/OS, to access locations across the storage bank for reading or writing the specified data elements.

This implementation differs from typical proprietary RAID 0 architectures at least because these embodiments utilize derivative file extent information generated by the storage node manager using the extent-based file system managed by the OS. The derived information can be utilized across any selected number of storage nodes, independent of any operating system and CPU, as described above with reference to FIG. 2. This allows the processor(s) and their operating system(s) to interact with the storage node manager precisely the same way, independent of how many storage devices/nodes are included the storage module(s)/bank(s), or the total number of storage devices/nodes.

In some embodiments, the computing system may adapt the hardware-based storage node manager 332 based on any suitable information, including, without limitation, the characteristics of the processing devices served by the storage node manager and/or the characteristics of those processing devices' storage access requests. In some embodiments, characteristics of a processing device on which adaptations are based may include, without limitation, the width of the bus coupling the storage node manager to a processing device. In some embodiments, characteristics of a processing device's storage access requests on which adaptations are based may include, without limitation, the size of the data elements being accessed by the processing device and/or the rate at which the processing device is accessing data elements. Adaptation of the storage node manager may, in some embodiments, improve the performance of the computing system.

Embodiments have been described in which a computing system 100 includes one or more reconfigurable computing module(s) 102 configurable to perform primitive tasks and a resource manager 110 adapted to manage the computing system's resources. In some embodiments, a computing module may be implemented using any suitable processing device, including, without limitation, an application-specific integrated circuit (ASIC), application-specific instruction-set processor (ASIP), digital signal processor (DSP), physics processing unit (PPU), graphics processing unit (GPU), network processor (NP), general-purpose programmable processor (e.g., CPU), microprocessor, microcontroller, multi-core processor, and/or any other device suitable for performing the specified primitive tasks. In some embodiments, a computing system may include at least one ASIC adapted to perform a searching primitive, at least one ASIC adapted to perform a counting primitive, and/or at least one ASIC adapted to perform a sorting primitive.

Embodiments have been described in which a reconfigurable computing system uses a hardware-based storage node manager to manage communication between one or more reconfigurable computing modules and one or more storage nodes. However, use of the hardware-based storage node manager is not limited to reconfigurable computing systems. In some embodiments, a hardware-based storage node manager may be used to manage communication between a storage node and any suitable processing device (e.g., an ASIC adapted to perform a primitive task).

Embodiments have been described in which a hardware-based storage node manager is implemented, at least in part, using reconfigurable hardware (e.g., one or more FPGAs). However, implementations of the hardware-based storage node manager are not limited to reconfigurable hardware. In some embodiments, a hardware-based storage node manager may be implemented without using reconfigurable hardware. In some embodiments, a hardware-based storage node manager may be implemented, at least in part, using one or more ASICs and/or any other suitable processing device.

Embodiments have been described in which "storage" includes non-volatile memory. In some embodiments, "storage" may include volatile memory.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present disclosure may be used alone, in combination, or in a variety of arrangements not specifically described in the foregoing, and the invention is therefore not limited in its application to the details and arrangement of components set forth in the foregoing description or illustrated in the drawings. For example, aspects described in one embodiment may be combined in any manner with aspects described in other embodiments.

TERMINOLOGY

The phraseology and terminology used herein is for the purpose of description and should not be regarded as limiting.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

While the invention has been particularly shown and described with reference to specific embodiments, it will be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

What is claimed is:

1. A system for accessing a file on a storage module comprising a plurality of storage nodes, the system comprising:
a field programmable gate array (FPGA) based storage node manager configured to manage the plurality of storage nodes of the storage module, and to:
communicate with a processing subsystem comprising a non-FPGA processor and an operating system (OS) configured to perform file management operations on the storage module, based at least in part, on a storage-module sector size independent of a sector size of at least one of the plurality of storage nodes of the storage module;
receive a request to access a portion of a file from a specialized processing unit, accessing comprising at least one of reading data from the file and writing data to the file without invoking by the non-FPGA processor a data access function provided by the OS;
receive a portion of file allocation information for the file to be accessed;
compute one or more storage node sector addresses corresponding to one or more data elements stored or to be stored in the file, based on at least in part: (i) the portion of file allocation information and (ii) a parameter of a plurality of storage nodes managed by the storage node manager, the parameter comprising: (A)

a number of storage nodes of the storage module, and (B) a sector size of each storage node; and provide, to the specialized processing unit, access to locations of the one or more data elements in the storage module using the one or more storage node sector addresses computed by the storage node manager based on the portion of file allocation information provided by the OS and the parameter of the storage nodes managed by the storage node manager.

2. The system of claim 1, wherein:
the received portion of file allocation information comprises extent information provided by the OS; and
the FPGA based storage node manager is configured to store an extents table comprising one or more rows corresponding to one or more extents, each row comprising a length field and an address field, the address field storing a computed storage node sector address.

3. The system of claim 1, wherein:
the received portion of file allocation information comprises extent information provided by the OS, the extent information comprising at least one data length for at least one extent; and
the FPGA based storage node manager is further configured to discard at least a portion of data accessed from at least one storage node using the at least one data length.

4. The system of claim 1, further comprising the storage module, the storage module comprising one or more storage nodes, each of the one or more storage nodes comprising at least one of a solid-state drive and a hard drive.

5. The system of claim 4, wherein each of the one or more storage nodes comprises a solid-Kate drive (SSD).

6. The system of claim 5, wherein:
the storage module further comprises a carrier board comprising the one or more SSDs, each SSD having a first architecture; and
the carrier board is swappable with another carrier board comprising one or more SSDs having a second, different architecture.

7. The system of claim 4, further comprising a non-FPGA based processor configured to access the storage module via the FPGA-based storage node manager.

8. The system of claim 1, further comprising:
the specialized processing unit comprising an FPGA-based processing unit; and
a bus interconnecting the FPGA-based processing unit and the FPGA-based storage node manager, for at least one of sending the one or more data elements to and receiving the one or more data elements from the FPGA-based processing unit.

9. A method for accessing a file on a storage module comprising a plurality of storage nodes, the method comprising:
communicating with a processing subsystem comprising a non-FPGA processor and an operating system (OS) configured to perform file management operations on the storage module, based at least in part, on a storage-module sector size independent of a sector size of at least one of the plurality of storage nodes of the storage module;
receiving a request to access a portion of a file form a specialized processing unit, accessing comprising at least one of reading data from the file and writing data to the file without invoking by the non-FPGA processor a data access function provided by the OS;
receiving, by a field programmable gate array (FPGA) based storage node manager for managing the plurality of storage nodes of the storage module, a portion of file allocation information for the file to be accessed, from the OS;
computing, by the storage node manager, one or more storage node sector addresses corresponding to one or more data elements stored or to be stored in the file, the computing based at least in part on (i) the portion of file allocation information and (ii) a parameter of a plurality of storage nodes managed by the storage node manager, the parameter comprising at: (A) a number of storage nodes of the storage module, and (B) a sector size of each storage node; and
providing, by the storage node manager to the specialized processing unit, access to location of the one or more data elements in the storage module using the one or more storage node sector addresses computed by the storage node manager based on the portion of file allocation information provided by the OS and the parameter of the storage nodes managed by the storage node manager.

10. The method of claim 9, further comprising storing, by the storage node manager, an extents table, wherein:
the received portion of file allocation information comprises extent information provided by the OS, and
the extents table includes one or more rows corresponding to one or more extents, each row comprising a length field and an address field, the address field storing a computed storage node sector address.

11. The method of claim 9, wherein the received portion of file allocation information includes extent information provided by the OS, the extent information including at least one data length for at least one extent, and wherein the method further comprises:
using the at least one data length to discard, by the storage node manager, at least a portion of data accessed from at least one storage node.

12. The method of claim 9, wherein accessing the locations of the one or more data elements from the storage module comprises accessing the locations of the one or more data elements from at least one of a solid-state drive and a hard drive.

13. The method of claim 9, wherein the plurality of storage nodes include a first solid-state drive having a first architecture, and wherein the method further comprises swapping a second solid-state drive for the first solid-state drive, the second solid-state drive having the first architecture or a second architecture.

14. The method of claim 9, further comprising the storage node manager providing the one or more data elements to a non-FPGA-based processor.

15. The method of claim 9, further comprising the storage node manager providing the one or more data elements to the specialized processing unit comprising an FPGA-based processor or receiving data from the FPGA-based processor via a bus interconnecting the FPGA-based processor and the storage node manager.

* * * * *